United States Patent

Nelson et al.

[11] Patent Number: 5,965,017
[45] Date of Patent: Oct. 12, 1999

[54] SEALED SHOWER SYSTEM FOR ROTARY VACUUM FILTER

[75] Inventors: Philip N. Nelson; Ronnie Marsh; Donald E. Haley; David Tidwell, all of Monroe, La.

[73] Assignee: Paper Inc., Monroe, La.

[21] Appl. No.: 08/893,058

[22] Filed: Jul. 15, 1997

[51] Int. Cl.⁶ .......................... B01D 33/06; B01D 33/60; D21C 9/02; D21C 9/06
[52] U.S. Cl. .......................... 210/217; 210/402; 210/406; 162/60; 68/200
[58] Field of Search ........................ 210/217, 232, 210/398, 402, 403, 404, 406; 162/60; 68/200

[56] References Cited

U.S. PATENT DOCUMENTS

| | | |
|---|---|---|
| 1,368,618 | 2/1921 | Faber . |
| 2,431,009 | 11/1947 | Young . |
| 3,215,277 | 11/1965 | Miles . |
| 3,795,319 | 3/1974 | Luthi et al. . |
| 3,878,698 | 4/1975 | Friksson et al. . |
| 4,205,541 | 6/1980 | Zucker . |
| 4,491,501 | 1/1985 | Klein . |
| 4,522,716 | 6/1985 | LaValley . |
| 4,563,244 | 1/1986 | Syed et al. . |
| 4,616,489 | 10/1986 | Wood . |
| 4,769,986 | 9/1988 | Kokkonen et al. . |
| 4,795,558 | 1/1989 | LaValley . |
| 4,907,426 | 3/1990 | Wood . |
| 4,951,879 | 8/1990 | Fay et al. . |
| 5,028,007 | 7/1991 | Wokal . |
| 5,565,110 | 10/1996 | Brady et al. . |

FOREIGN PATENT DOCUMENTS 449698 7/1942 Canada .

Primary Examiner—Thomas M. Lithgow
Attorney, Agent, or Firm—Rossi & Associates

[57] ABSTRACT

A sealed shower system applies shower water to a pulp mat as it passes through a sealed chamber under a vacuum with an air supply that is externally regulated. The shower water forms a pond or film on the pulp mat. The amount of entrapped air is minimized through a downleg of a filter drum which results in maximum filtrate flow, an increased drainage rate, higher efficiency washing and a requirement for less shower water per pound of pulp. In addition, with less entrapped air in the filtrate, the length of the downleg can be reduced enabling lower building heights, smaller filtrate tanks and foam handling systems. The sealed shower system also forms part of a combined shower/hood structure that greatly reduces exhaust emissions.

15 Claims, 10 Drawing Sheets

SEALED SHOWER SYSTEM FOR ROTARY VACUUM FILTER

FIELD OF THE INVENTION

The invention relates in general to a rotary vacuum filter used in brownstock, bleach, saveall and decker applications in the pulp and paper industry. More specifically, the invention relates to a sealed shower system which can also be incorporated into a low profile hood.

BACKGROUND

Rotary vacuum filters were introduced shortly after the turn of the century to separate minerals from dirt and water in the mining industry. A drum was rotated in a vat in which the minerals and water were suspended. A vacuum was created in a downleg of the rotary vacuum filter as clean shower water was sprayed on the surface of the rotating drum. The waste water passed through the drum under force of the vacuum leaving minerals entrapped on the drum surface.

Rotary vacuum filters were subsequently utilized in the pulp and paper industry to separate pulp from the cooking or process liquids. Rotary vacuum filters used to process minerals had no problem with atmospheric spraying of the wash water, because the liquid displaced in mineral washing was not viscous. Pulp, however, is cooked with a liquor that forms a gluey viscous substance referred to as black liquor that must be removed from the pulp in brownstock washing. Any liquor not removed by the brownstock washing is carried on through the process to the deckers, saveall and bleach plant.

For years the rotary vacuum filters used in brownstock washing have been environmentally inefficient in their use of fresh water and exhaust emissions. Conventional methods of spraying shower water in a substantially open atmosphere, such as whistle, spoon, fluid flow and weir showers, cause air to become entrapped in the black liquor. In conventional systems, as much as fifty percent of the filtrate passing through the downleg consists of air molecules. The entrapped air restricts the black liquor drainage rate through the filter drum and downleg thereby reducing the efficiency of the system. In addition, entrapped air causes a tremendous amount of foaming throughout the brownstock system. Accordingly, pulp washing systems have required the use of expensive filtrate tanks and defoamers to allow the entrapped air to migrate to the surface of the black liquor tank prior to being pumped to evaporator storage. The overall impact of air entrapment is a reduction in washing efficiency that results in more fresh water being required to clean a pound of paper pulp.

In view of the above, it is an object of the present invention to provide a sealed shower system for a rotary vacuum filter that overcomes the air entrapment problems associated with the conventional brownstock and bleach washers.

It is a further object of the present invention to provide a seeded shower system for a rotary vacuum filter that is incorporated into a low profile hood to reduce exhaust emissions of a rotary vacuum filter.

SUMMARY OF THE INVENTION

The present invention provides a sealed shower system that overcomes the problems associated with conventional pulp washing shower systems. The sealed shower system applies shower water to a pulp mat as it passes through a sealed chamber under a vacuum with an air supply that is externally regulated. The shower water forms a pond or film on the pulp mat. The amount of entrapped air is minimized through a downleg of a filter drum which results in maximum filtrate flow, an increased drainage rate, higher efficiency washing and a requirement for less shower water per pound of pulp. In addition, with less entrapped air in the filtrate, the length of the downleg can be reduced enabling lower building heights, smaller filtrate tanks and foam handling systems.

In a preferred embodiment, the shower system includes at least one shower module having at least one shower; a support mechanism for supporting the shower module; and sealing mechanism for sealing top, side and bottom portions of the shower module. The sealing mechanism includes a separator plate that seals the bottom portion of the shower module and a top seal that seals a top portion of the shower module. The top seal preferably utilizes either a curved spring arm or a collapsible seal tip. An air regulation channel is provided to regulate air flow through the shower system. The modular nature of the shower system permits multiple shower modules to be employed in a single wash zone or multiple shower modules for different wash zones on the same drum. The shower system is also preferably incorporated into a combined shower/hood system, in which the shower module forms part of the hood structure.

Other advantages, features and objects of the invention will become apparent after review of the following detailed description of the preferred embodiments.

BRIEF DESCRIPTION OF THE DRAWINGS

The invention will be described in greater detail with reference to certain preferred embodiments and the accompanying drawings, wherein.

DETAILED DESCRIPTION OF THE PREFERRED EMBODIMENTS

Figure 1:
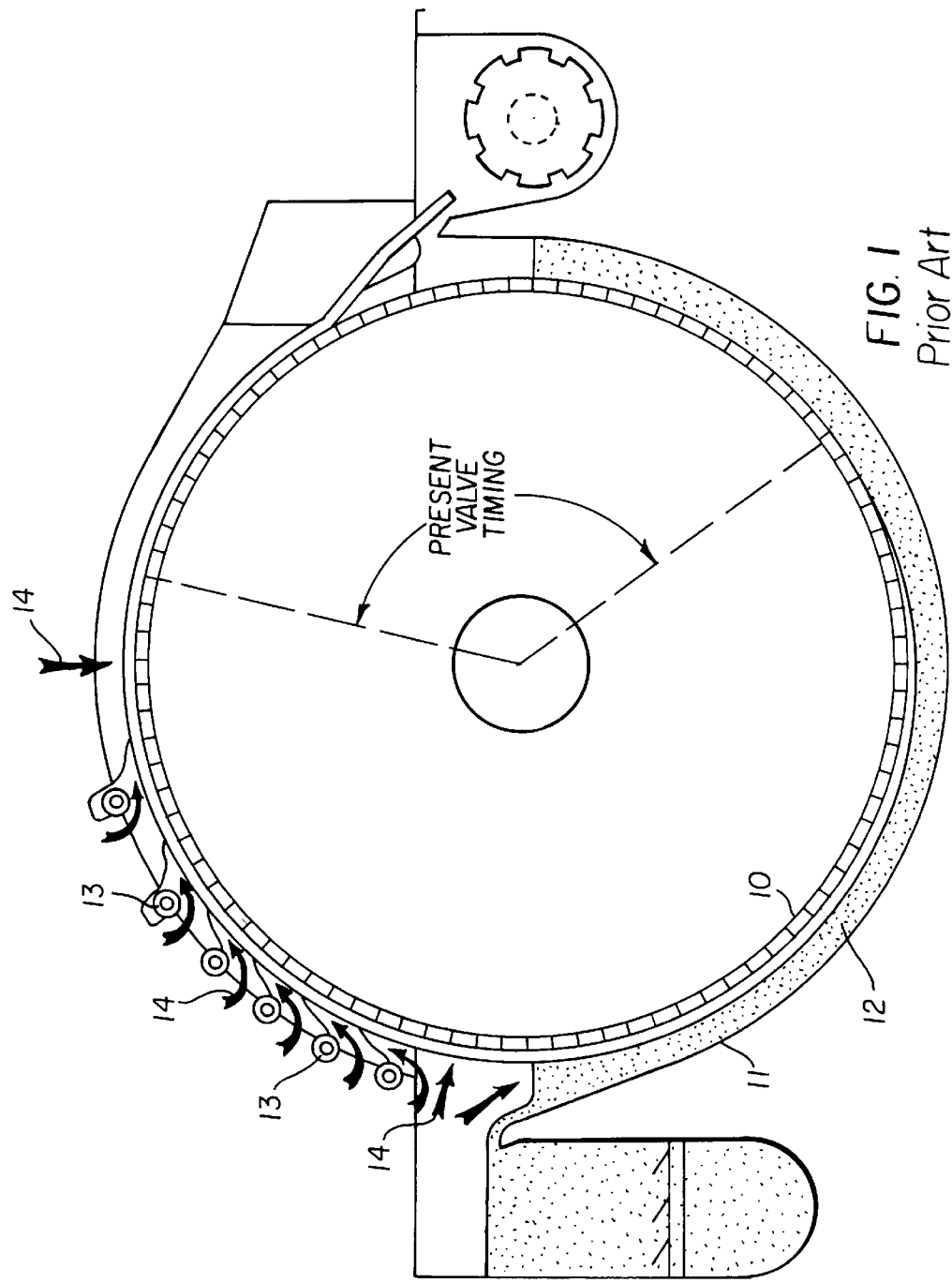
FIG. 1 illustrates a conventional shower system that is essentially open to the atmosphere.

A conventional rotary vacuum filter will first be described with reference to FIG. 1. The conventional rotary vacuum filter includes a drum 10 that is suspended in a vat 11 containing a pulp slurry 12. A plurality of parallel shower pipes 13 are spaced at regular angular intervals around the drum 10 beginning at an approximately 9:30 starting position and ending at an approximately 11:30 ending position as defined by a clock face. The shower pipes 13 extend axially around the drum 10 and are supported and fed from their respective ends by a header assembly. Each of the shower pipes 13 includes a plurality of individual shower typess, such as spoon, whistle, fluid flow or weir, that spray shower water onto a pulp mat which accumulates on a surface of the drum 10 during operation. Examples of typical types of shower pipes are shown U.S. Pat. No. 5,028,007 issued to Wokal, and U.S. Pat. No. 4,907,426 issued to Wood et al.

Figure 2:
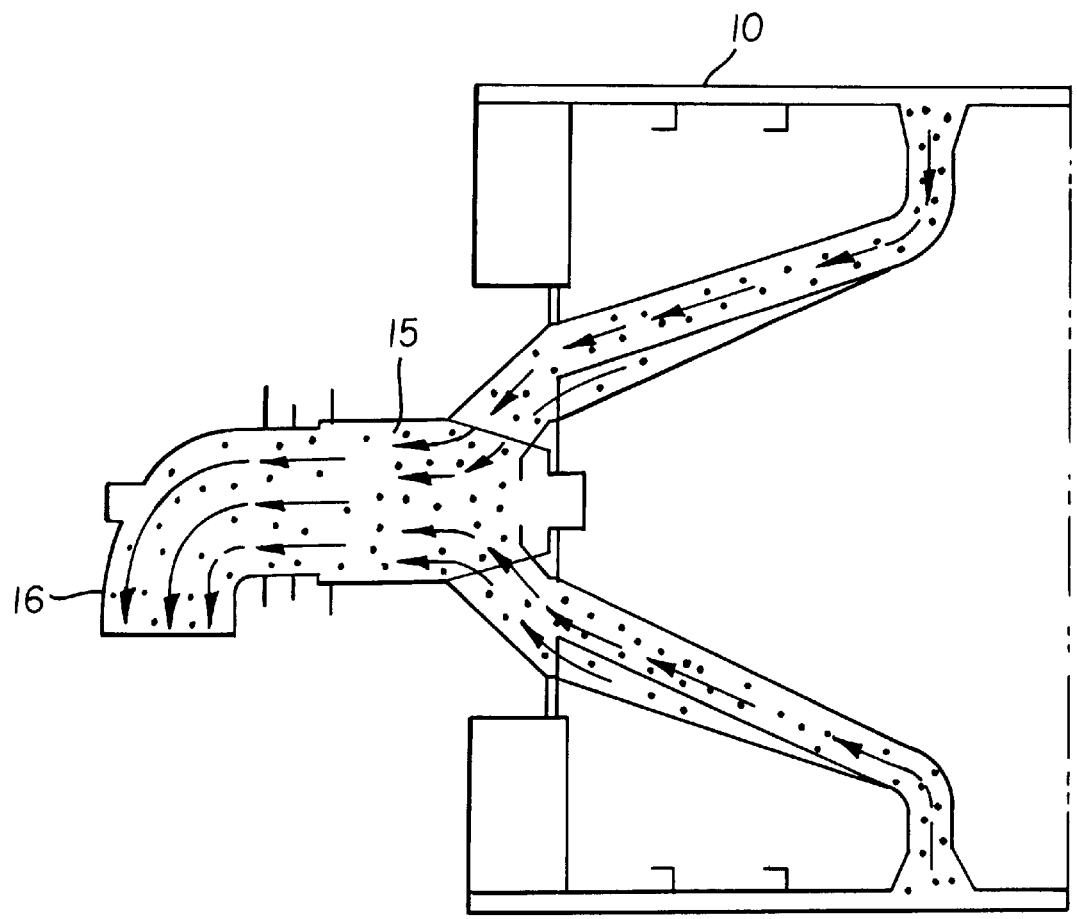
FIG. 2 illustrates the entrapped air in the filtrate flowing through a downleg of the system shown in FIG. 1.

The conventional showers described above operate in an open atmosphere, in which air 14 passing through and around the shower pipes 13 is not controlled and causes continual entrapment of excessive air in the filtrate. The entrapped air 15, as shown in FIG. 2, restricts the filtrate flow rate through the downleg 16 of the rotary vacuum filter, since the air molecules take up space intended for filtrate, and also disrupts uniform shower displacement. Accordingly, the entrapped air limits washing efficiency and increases defoamer usage, which in turn causes the use of greater amounts of fresh shower water due to inefficient washing. Further, the conventional showers described above tend to plug with pulp fibers and are difficult to clean, thereby creating unbalanced shower flows and uneven mat profiles and liquor distribution.

Figure 3:
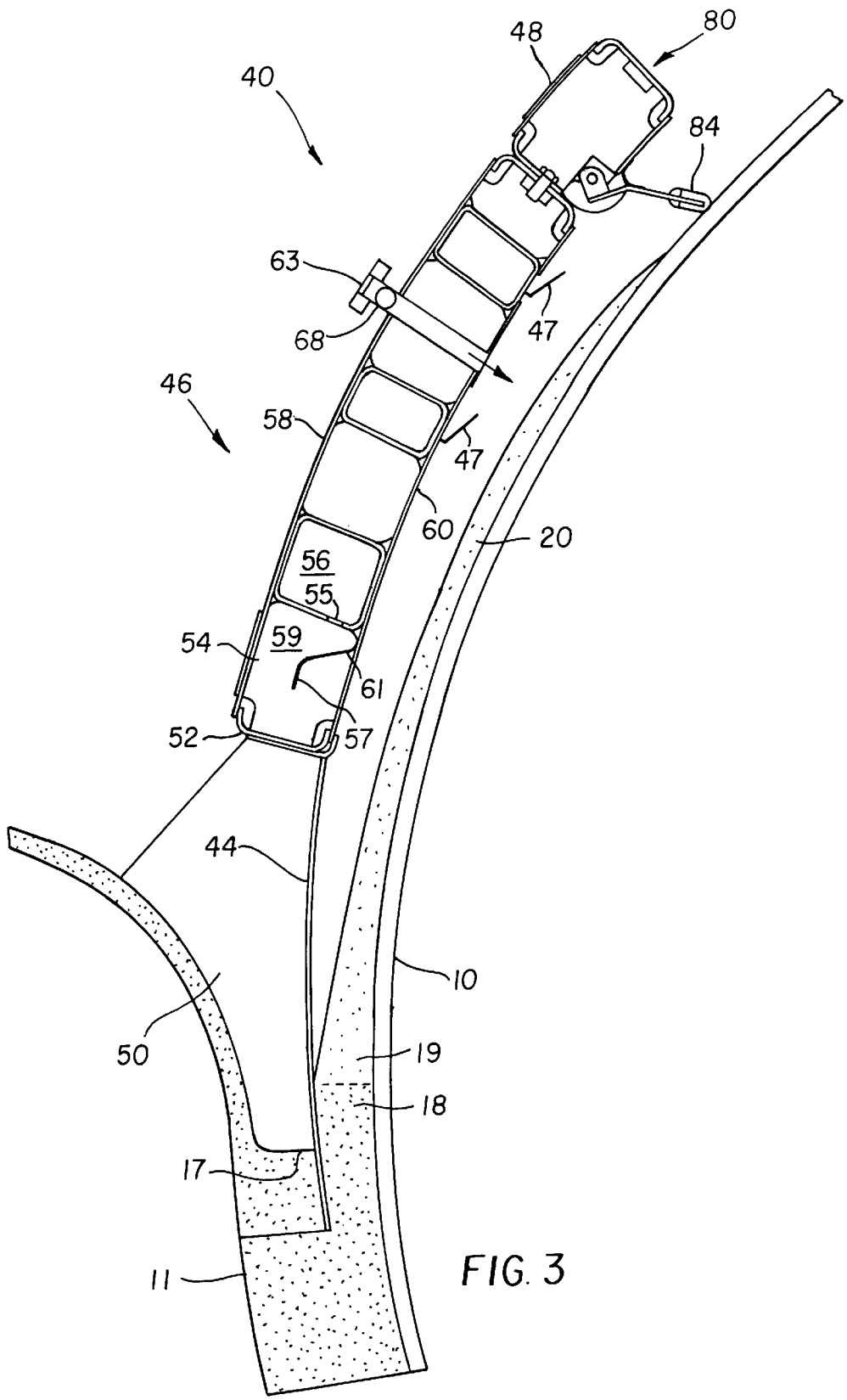
FIG. 3 illustrates an embodiment of a sealed shower system incorporated on a rotary vacuum filter in accordance with the present invention.

Referring now to FIG. 3, a sealed shower system 40 in accordance with the invention is illustrated in close proximity, preferably less than about 50 centimeters and most preferably in a range of about 10–35 centimeters, from the surface of a rotary vacuum filter drum 10. The top, bottom and sides of the shower system 40 are sealed, as will be described in greater detail, to create a controlled environment in which the amount of air passing through the shower system 40 is regulated through a controlled air passage 63. Shower water supplied through the shower system 40 preferably forms a pond 19 that extends across the face of the pulp slurry as the pulp slurry is pulled into the bottom of the shower system 40 from a lower level 17 in the vat 11 to a higher level 18. As a pulp mat is formed and is rotated upward on the surface of the drum 10, the shower water extends from the pond 19 to form a film 20 on the surface of the pulp mat.

As shown in FIG. 3, the bottom of the shower system 40 is sealed by a separator plate 44. The separator plate 44 is supported on the vat structure 11 by one or more support gussets 50, and extends across the width of the drum 10 to the end shields of the vat structure 11. A lower portion of the separator plate 44 extends into the pulp slurry contained in the vat structure 11 during operation of the rotary vacuum filter, thereby preventing air from entering into the bottom of the shower system 40. The separator plate 44 is preferably provided with a U-shaped receiver 52 that supports a bottom of a shower module 46 located between the separator plate 44 and a top seal 80.

Figure 4:
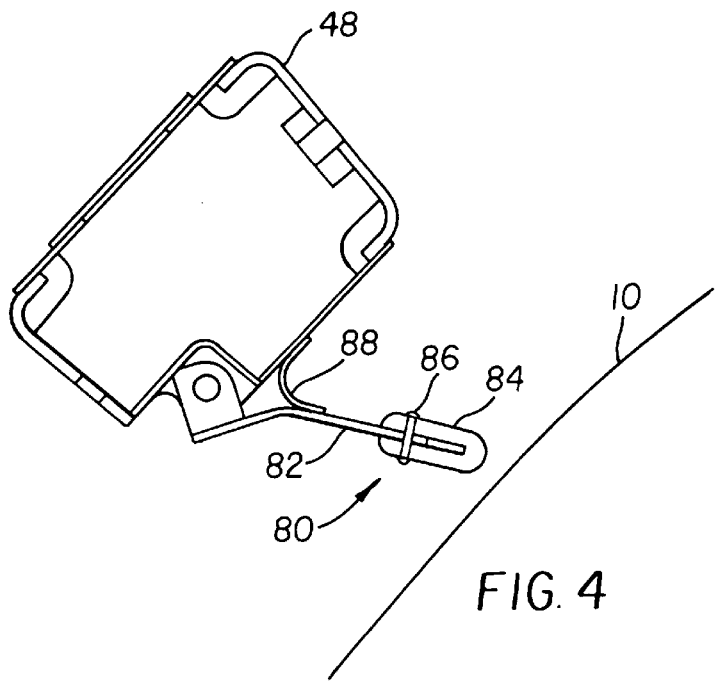
FIG. 4 illustrates a top seal incorporated in the sealed shower system shown in FIG. 3 that includes a collapsible seal tip.

The top of the shower system is sealed by a top seal 80. In a preferred embodiment, the top seal 80 preferably comprises a removeable top seal module 48 that is bolted onto the shower module 46 for easy removal for servicing or replacement, although the top seal 80 can be permanently attached to the shower module 46 if so desired. As shown in greater detail in FIG. 4, the top seal module 48 includes a seal tip 84 that preferably rides just a few centimeters above surface of the drum 10. The seal tip 84 is attached to a spring arm 82 by a shear type connection mechanism 86, for example, a bolt or rivet designed to shear at a certain load prior to the shear point of the spring arm 82. The seal tip 84 is preferably made from plastic, Teflon™ or a composite material. A spring 88 pushes the spring arm 82 in a downward direction when the drum 10 is being rotated in the clockwise direction. In the event that the rotation of the drum 10 is reversed without removing the top seal module 48 and the seal tip 84 comes into contact with the surface of the drum 10, the shear type connection mechanism breaks and allows the seal tip 84 to come free or collapse by sliding up the spring arm 82, therefore, avoiding drum damage.

Figure 5:
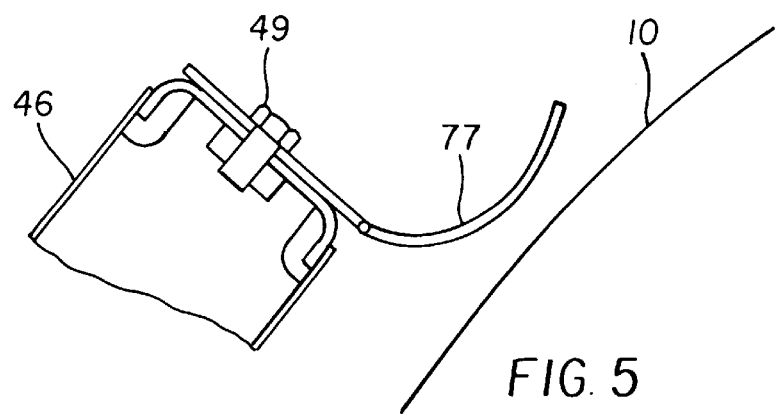
FIG. 5 illustrates a top seal including a curved spring arm.

Alternative embodiments for the structure of the top seal 80 are possible. FIG. 5, for example, illustrates a top seal curved spring arm 77 made of plastic or steel that is an option to the top seal module 48 described above. The curved spring arm 77 is attached to the shower module 46 by a bolt 49, and rides a few centimeters above the drum surface. The use of the curved spring arm 77 greatly simplifies the design of the top seal 80. As with the top seal module 48, the curved spring arm 77 may also be permanently attached to the shower module 46.

Referring back to FIG. 3, the shower module 46 includes at least one shower 54, preferably a weir type, although one or more additional showers 47 can be provided. In the illustrated embodiment, the weir type shower 54 receives shower liquid from an adjacent shower supply channel 56, which is formed as a longitudinal structure between inner and outer surface plates 58, 60 of the shower module 46. The shower liquid passes through openings 55 in the shower supply channel 56 and into the shower 54, where the shower liquid passes around a diverter plate 57 and flows smoothly to an outlet passage 61. In a preferred embodiment, the diverter plate is attached to an outer plate 60 of the shower module 46, and can be easily detached and removed through the oulet passage 61 to allow easy access to the internal shower structure for cleaning.

Figure 6:
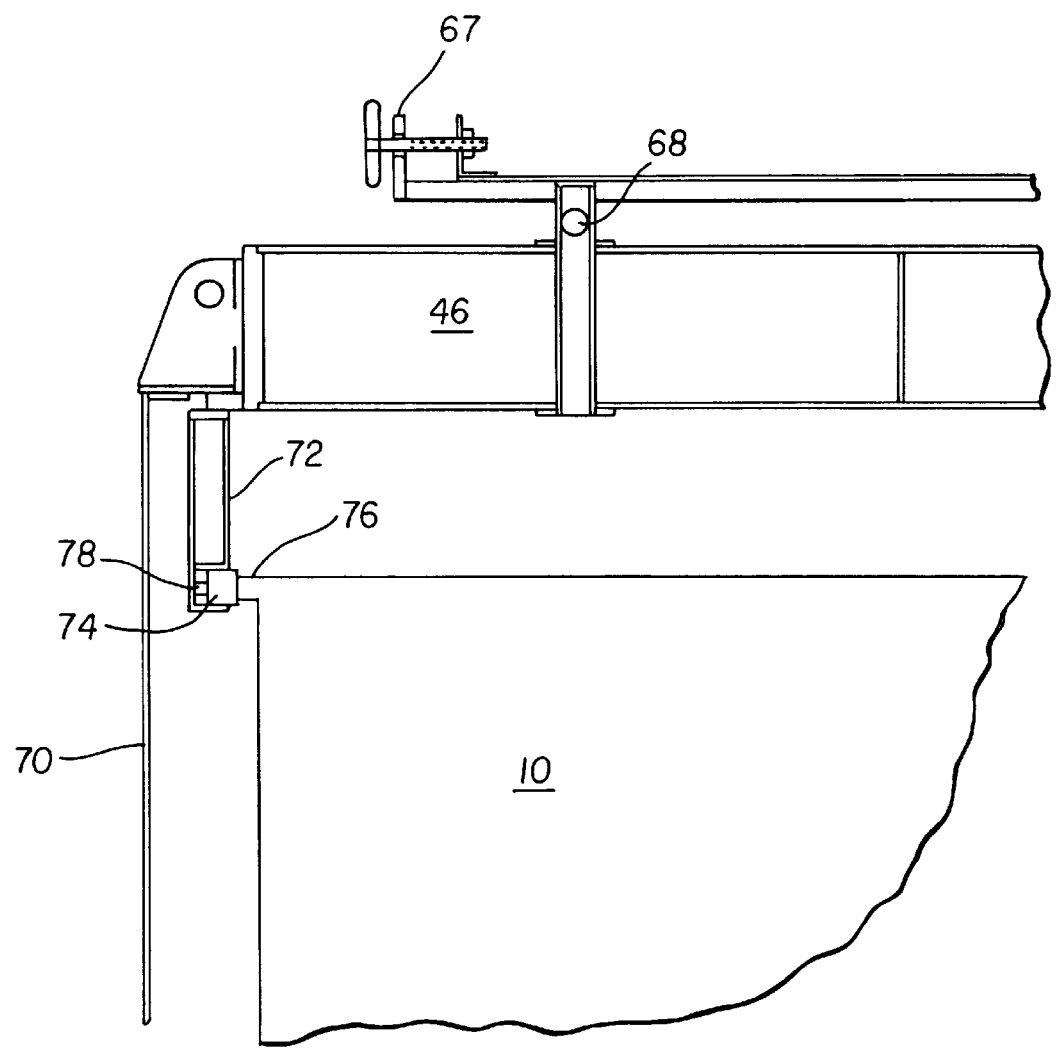
FIG. 6 illustrates a horizontal side shower seal for the system illustrated in FIG. 3.
Figure 7:
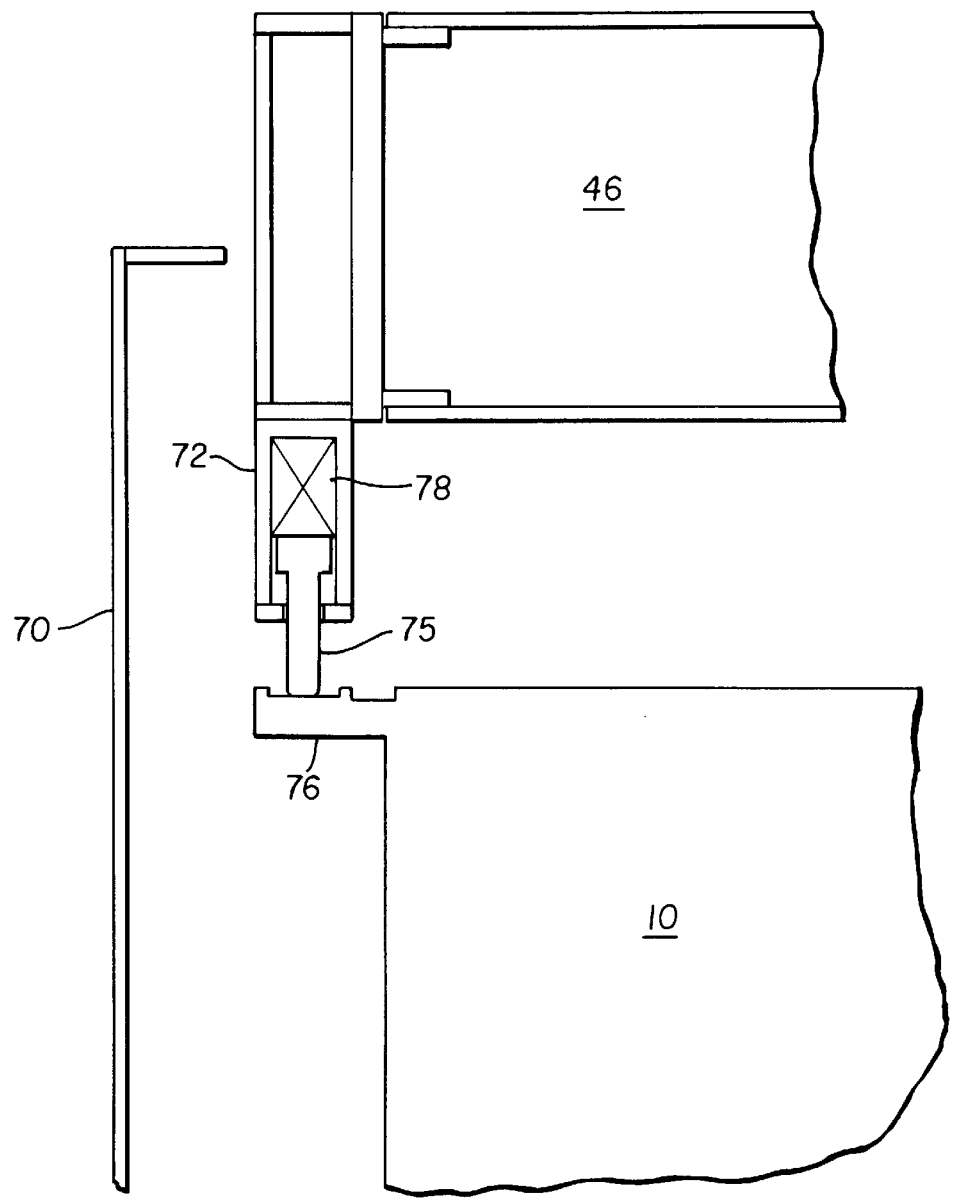
FIG. 7 illustrates a vertical side shower seal for the system illustrated in FIG. 3.

The ends of the sealed shower module 46 rest on or are attached to the splash shields 70 of the vat structure 11 as illustrated in FIG. 6. An end sealing assembly 72 is provided on both ends of the shower module 46 that includes a horizontal shower seal 74 that is pressed into contact with an end band 76 of the drum 10 by an element 78 such as a spring, Tygon or similar material. In an alternative embodiment illustrated in FIG. 7, the vertical shower seal 75 is pressed downward into contact with the end band 76. If desired, the end band 76 can be covered with an end band seal (not shown) made of a material similar to the material used for the horizontal or vertical shower seals 74, 76 or any another material having a lower coefficient of friction than the end band 76 of the drum 10, thereby reducing wear on the horizontal and vertical shower seals 74, 76.

Figure 8:
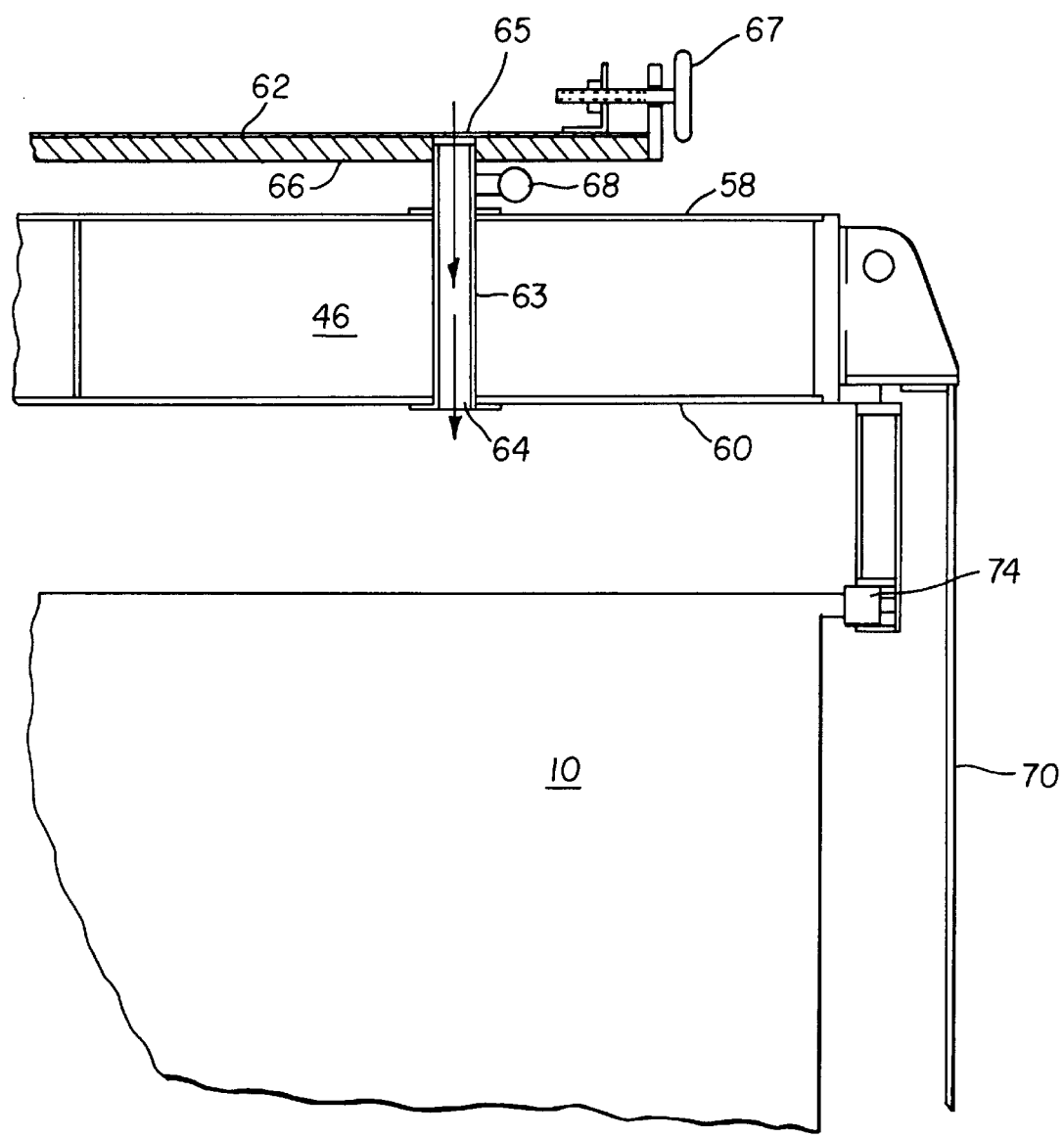
FIG. 8 is a perspective view of the shower system illustrated in FIG. 3 showing an air regulation device on an outer plate of the shower system.

FIG. 8 illustrates a preferred controlled air flow channel 62 in greater detail. The controlled air flow channel 63 permits a regulated amount of air to enter the shower module 46, and has air passages 64 located on the inner and outer plates 60 and 58 of the shower module 46. The amount of air passing through the air passages 64 is regulated by a device including a sliding plate 62 and a stationary plate 66 located on the outer plate 58, wherein the sliding plate 62 can be positioned to block the air passages 64 to any desired degree by operation of a hand wheel to control the amount of air entering the shower module 46. In the illustrated example, the sliding plate 62 slides over the stationary plate 66 which is located above the surface of the outer plate 58 to provide clearance for access panels or doors located on the surface of the outer plate 58, although it is also possible to located the sliding plate 62 directly on the outer plate 58. One or more vacuum relief valves 68 are also preferably provided in the air flow channel 64, or at some other location in the sealed shower system, in the event that the normal air passages become clogged or some other factor causes an increase in vacuum above a predetermined design criteria, thereby preventing the shower module 46 from being pulled into contact with the drum 10.

Figure 9:
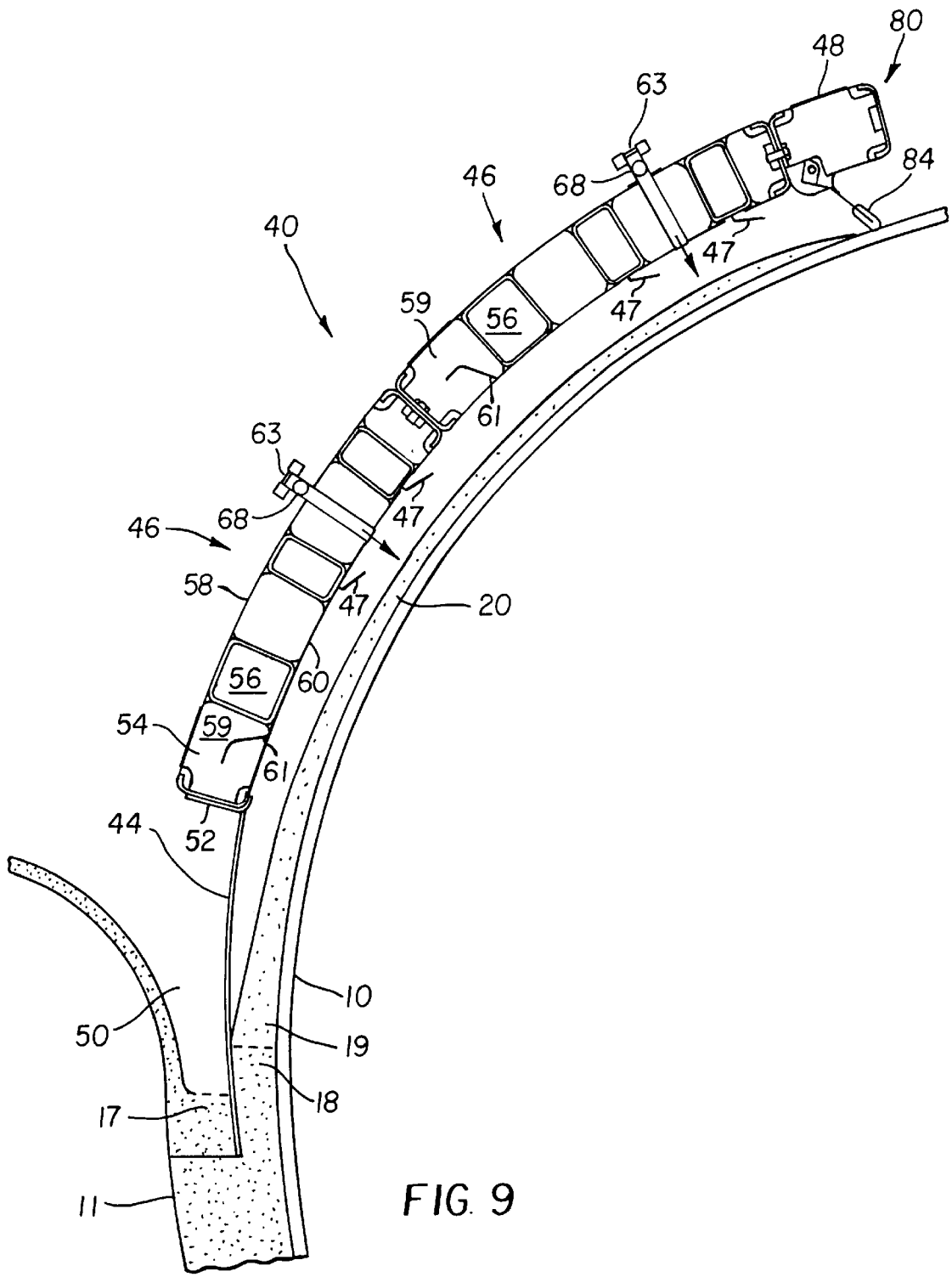
FIG. 9 illustrates an embodiment of the invention including an upper and lower sealed shower having an increased wash zone.
Figure 10:
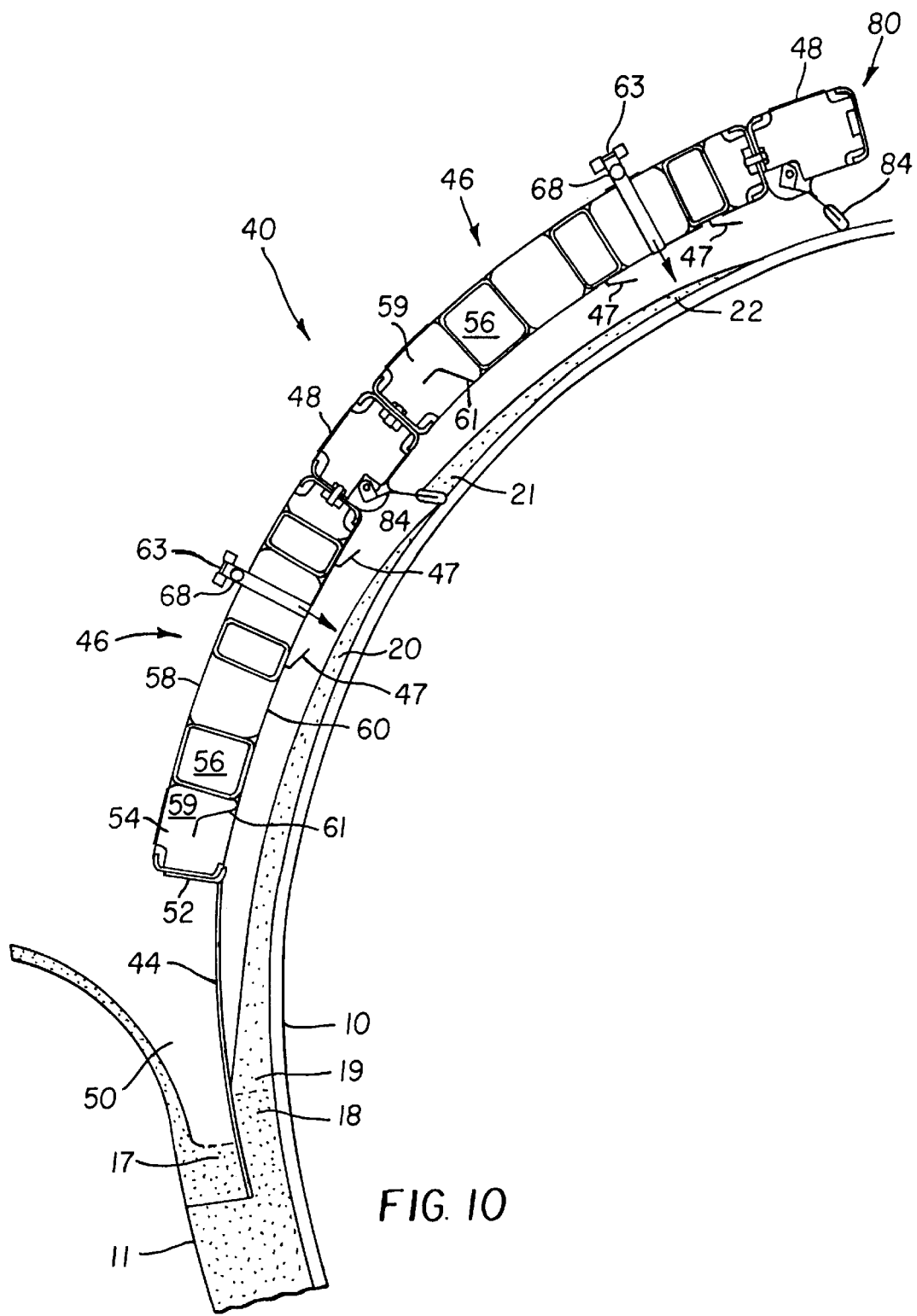
FIG. 10 illustrates an embodiment of the invention adapted for multistage washing on a single drum.

The flexible design of the shower system 40 enables many combinations to be utilized in order to maximize performance for any particular washing installation. FIG. 9, for example, illustrates a further embodiment in which two shower modules 46 are combined in one shower system thereby increasing the number of showers and the size of the wash zone for a given drum. In addition, different types of showers or combination of showers can be easily employed and/or interchanged. Further, by locating an additional intermediate seal module 48 (preferably having the same structure as the top seal) between two shower modules 46 as shown in FIG. 10, it is possible to accomplish multistage washing on a single drum by supplying different shower liquids to each of the two shower modules 46. In such a case, the pond 19 and film 20 formed in the lower shower are independent of the pond 21 and film 22 formed in the upper shower.

Figure 11:
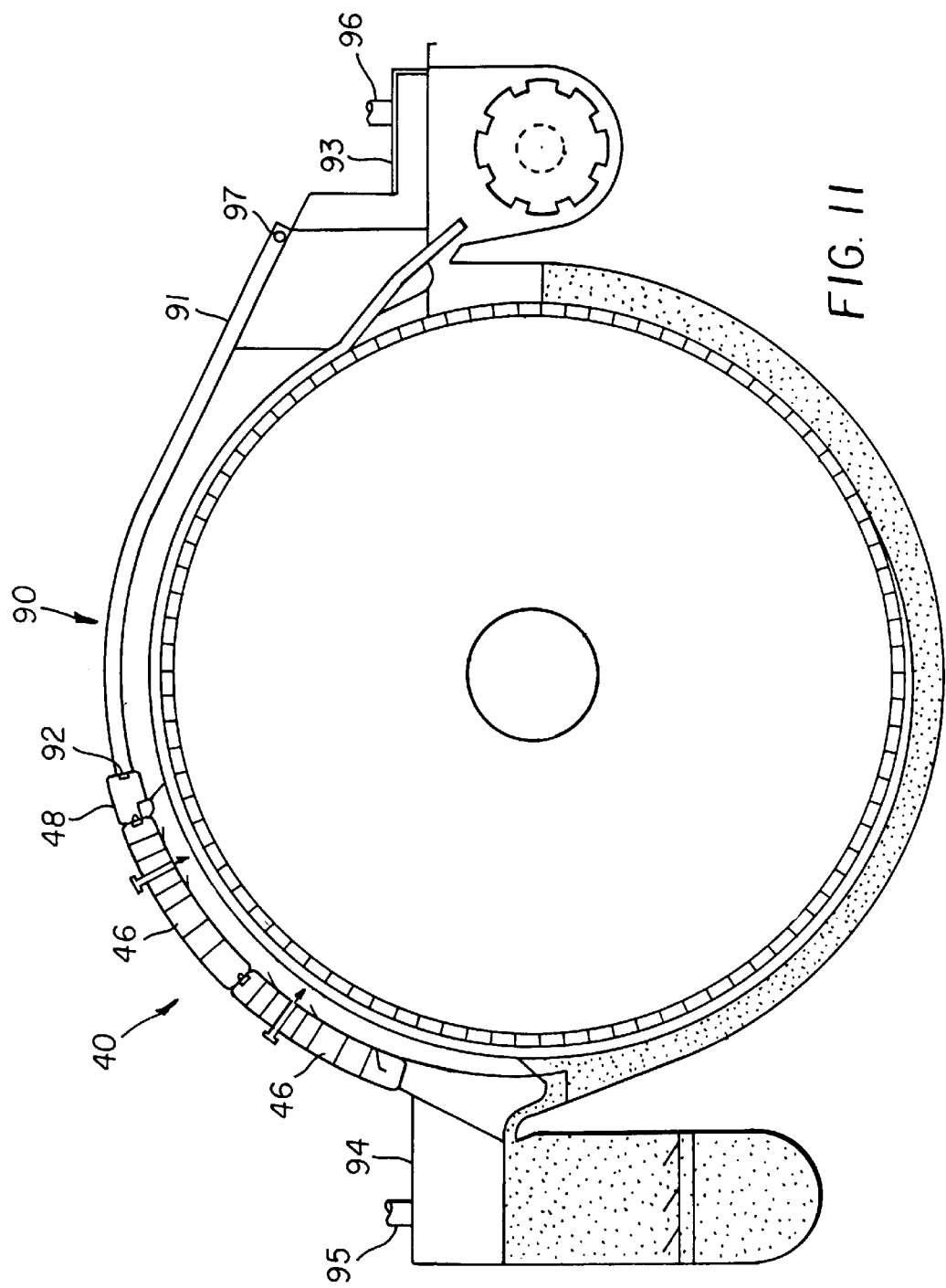
FIG. 11 illustrates a shower/hood module in accordance with the invention that provides a low profile hood.

The modular design and the flexibility of controlling the amount of shower water at a given location makes rotary vacuum filters of the present invention environmentally competitive with respect to maximizing washing efficiencies and conserving shower water and energy. In addition, the sealed shower design permits a low profile shower/hood 90 to be employed as shown in FIG. 11 that reduces exhaust emissions. As shown in FIG. 11, the shower system 40 serves as a dual purpose because it acts as a hood in the wash zone where air is moving inward. By providing a discharge hood section 91 that encloses the entire takeoff section of the rotary vacuum filter and is attached to the shower system 40 and providing a seal 94 over the inlet vat, a continuous low profile hood is provided for the entire rotary vacuum filter. The exhaust for the hood is located at the inlet 95 and outlet 96. A hinged connection 92 is preferably used to connect the hood section to the shower system 40, thereby allowing the hood section 91 to be rotated back for maintenance.

The illustrated hood design substantially reduces air emissions when compared to a standard brownstock open style hood, which is normally located about six feet above the filter drum. Further, substantial exhaust reductions are achieved with the low level hood in bleach plants when compared to standard bleach canopy hoods, which is normally located about two feet above the drum.

The invention has been described with reference to certain preferred embodiments thereof. It will be understood, however, that modifications and variations are possible within the scope of the appended claims.

What is claimed is:

1. A shower system for a rotary vacuum filter comprising:
   a) at least one shower module including at least one shower;
   b) support means for supporting the shower module over a surface of a rotary drum filter that is suspended in a vat structure; and
   c) sealing means for sealing top, side and bottom portions of the shower module, wherein the sealing means includes a separator plate that extends into the vat structure to seal a bottom portion of the shower module when a fluid is contained in the vat structure.

2. A shower system as claimed in claim 1, wherein the sealing means includes a removable top seal that seals a top portion of the shower module.

3. A shower system as claimed in claim 1, wherein the sealing means includes a top seal that comprises a curved spring arm.

4. A shower system as claimed in claim 1, wherein the sealing means includes a top seal that comprises a collapsible seal tip.

5. A shower system as claimed in claim 1, wherein the side sealing means includes at least one of a horizontal shower seal and a vertical shower seal.

6. A shower system as claimed in claim 1, further comprising air flow regulation means for regulating air flow through the shower system.

7. A shower system as claimed in claim 1, further comprising at least one vacuum relief valve provided in said shower module.

8. A shower system as claimed in claim 1, wherein at least two shower modules are coupled together, such that a top portion of a first shower module is coupled to a bottom portion of a second shower module.

9. A shower system as claimed in claim 8, wherein the first and second shower modules are coupled together via an intermediate seal that is coupled to the top portion of the first shower module and the bottom portion of the second shower module.

10. A combined shower/hood system for a rotary vacuum filter having an inlet vat, at least one filter drum and a takeoff section, said shower/hood system comprising:
    a) at least one shower module including at least one shower;
    b) support means for supporting the shower module over a filter drum of a rotary vacuum filter that is suspended in a vat structure;
    c) sealing means for sealing top, side and bottom portions of the shower module with respect to a surface of the filter drum, wherein the sealing means includes a separator plate that extends into the vat structure to seal a bottom portion of the shower module when a fluid is contained in the vat structure;
    d) air flow regulation means for regulating the flow of air through the shower module; and
    e) a discharge hood that is coupled to the shower module and extends to a take off section of the rotary vacuum filter.

11. A combined shower/hood system as claimed in claim 10, wherein said shower module and said discharge hood are located less than about fifty centimeters above the surface of the filter drum.

12. A combined shower/hood system as claimed in claim 10, wherein said shower module and said discharge hood are located in a range of about ten to thirty-five centimeters above the surface of the filter drum.

13. A combined shower/hood system as claimed in claim 10, wherein at least two shower modules are coupled together, such that a top portion of a first shower module is coupled to a bottom portion of a second shower module and the discharge hood is coupled to a top portion of the second shower module.

14. A shower system as claimed in claim 13, wherein the first and second shower modules are coupled together via an intermediate top seal that is coupled to the top portion of the first shower module and the bottom portion of the second shower module and the discharge hood is coupled to the top portion of the second shower module via a top seal.

15. A shower system as claimed in claim 10, further comprising at least one vacuum relief valve provided in said shower module.

* * * * *